United States Patent [19]

Brocoff

[11] 4,012,488

[45] Mar. 15, 1977

[54] PROCESS FOR THE TREATMENT OF SULFUR AND NITROGEN OXIDES FORMED DURING POWER GENERATION

[75] Inventor: Jack Brocoff, Fullerton, Calif.

[73] Assignee: Ralph M. Parsons Company, Pasadena, Calif.

[22] Filed: Mar. 13, 1974

[21] Appl. No.: 450,550

[52] U.S. Cl. .............................. 423/244; 423/239; 423/564; 423/359; 431/4; 431/10; 423/235

[51] Int. Cl.$^2$ ................ C01B 17/00; C01B 17/16; C01B 21/00; F23J 7/00

[58] Field of Search .......................... 423/242–244, 423/352, 359, 360, 235, 239, 564, 351; 431/4, 10; 110/1 J, 1 K

[56] References Cited

UNITED STATES PATENTS

| | | | |
|---|---|---|---|
| 1,909,378 | 5/1933 | Richardson | 423/360 |
| 2,910,343 | 10/1959 | Childers et al. | 423/351 |
| 3,418,258 | 12/1968 | Ackerman | 423/244 |
| 3,454,355 | 7/1969 | Ryason | 423/239 |
| 3,752,877 | 8/1973 | Beavon | 423/244 |
| 3,755,550 | 8/1973 | Stiles | 423/244 |
| 3,794,710 | 2/1974 | Morrill | 423/244 |
| 3,838,193 | 9/1974 | Kajitani et al. | 423/235 |

FOREIGN PATENTS OR APPLICATIONS 643,807   6/1962   Canada .............................. 423/564

*Primary Examiner*—Oscar R. Vertiz
*Assistant Examiner*—Gregory A. Heller
*Attorney, Agent, or Firm*—Christie, Parker & Hale

[57] ABSTRACT

A catalyst chamber capable of converting the oxides of sulfur to hydrogen sulfide and the oxides of nitrogen to inert nitrogen and ammonia in the presence of a reducing atmosphere is inserted downstream of the boiler section of a fossil fuel burning power generator and there is added a system for extracting formed hydrogen sulfide from the fuel gas stream.

After combustion of the primary fuel, typically sulfur bearing coal in excess air, a gaseous hydrocarbon such as methane, is combined with the products of combustion to at least scavenge the oxygen present to form a boiler effluent which ranges from slightly oxidizing to reducing in nature.

Where the boiler effluent is reducing in nature, partial conversion of the oxides of sulfur and the oxides of nitrogen occur in the boiler, the balance occurring in the catalyst chamber.

Where the gas is slightly oxidizing or only slightly reducing, make up reducing gas is added to the flue gas, either from an external reducing gas generator, or by removing a portion of the flue gas from the boiler section for combination with a vaporized hydrocarbon and air in a secondary boiler to generate the reducing gas for the reactions to take place in the catalyst chamber.

The catalyst chamber is typically operated at a temperature from about 300° to about 800° F. In addition to eliminating air pollutants, boiler efficiency is increased.

15 Claims, 4 Drawing Figures

PROCESS FOR THE TREATMENT OF SULFUR AND NITROGEN OXIDES FORMED DURING POWER GENERATION

BACKGROUND OF THE INVENTION

For a few years and in the interest of the ecology, low sulfur fossil fuels are used in the generation of energy by the combustion of low sulfur coal and similar low sulfur carbonaceous materials.

Depleting fuel reserves, however, have dictated the necessity of combusting fossil fuels of high sulfur content.

With this, considerable interest has developed in the ability to combust high sulfur fuels and still emit a flue gas to the atmosphere which is sufficiently low in the oxides of sulfur, that a problem will not be presented from an ecology standpoint.

Many processes have been proposed for the removal of the oxides of sulfur from the stack gases emitting from the boiler sections of power generation systems.

Most are complicated and involve additional operating and maintenance expense in addition to high initial capital cost for new installations. They are also cumbersome and costly to adapt to existing installations.

Some involve injection scrubbing operations, which entail additional raw materials and material handling cost, add nothing to fuel efficiency, rather decrease it, and result in slurry disposal problem.

In another process, sulfur dioxide is scrubbed from the gas and regenerated as sulfur dioxide. Operating costs are high and the oxides of nitrogen introduce complications to sulfur dioxide removal. Further, sulfur dioxide is not a desirable by-product and must be converted to sulfuric acid or to sulfur at a considerable additional expense.

SUMMARY OF THE INVENTION

According to the present invention, there is provided apparatus and a method to improve the economy of fuel burning, power generators such as power plant boilers and the like, while at the same time minimizing objectionable emissions of the oxides of sulfur and nitrogen to the atmosphere.

In accordance with the invention the boiler of a power generator is modified to allow for the introduction of a hydrocarbon fuel, such as methane, capable of forming a reducing gas, into the combustion chamber of a boiler burning the sulfur bearing fuel above the primary flame zone where virtually all the carbon contained in the sulfur bearing fuel has been combusted.

The amount of hydrocarbon introduced is sufficient to form a reducing gas in an amount at least sufficient to scavenge the excess oxygen normally present during the combustion of the fuel to render the resultant mixture of gases slightly oxidizing up to that required to create a reducing atmosphere containing sufficient hydrogen for the conversion of the contained oxides of sulfur to hydrogen sulfide and the oxides of nitrogen to inert nitrogen or ammonia. When the fuel is natural gas or essentially sulfur free, the reducing gases are employed to convert the oxides of nitrogen to nitrogen and/or ammonia. In the case of vaporized hydrocarbon fuels such as natural gas, a portion may be used as the primary fuel and the balance to form the reducing gas.

The gas stream is then allowed to pass through the remaining sections of the boiler and to the added catalytic conversion zone containing a catalyst capable of converting the oxides of sulfur to hydrogen sulfide by reaction with the hydrogen present in the reducing gas and the oxides of nitrogen by reaction with the reactants present to form inert nitrogen and/or ammonia at a temperature from about 300° to about 800° F.

Preferably, insufficient light hydrocarbon is added to the boiler itself, and provisions are made to introduce an externally generated make up reducing gas between the electrostatic precipitator and the added catalyst section. This allows conventional materials of construction to be used in the boiler section itself without fear of creating corrosive conditions. Make up reducing gas may be formed in an auxiliary boiler using a portion of the boiler flue gas as part of the feed of the auxiliary boiler. There is also added means to separate the formed hydrogen sulfide from the flue gas with absorption techniques being preferred.

Using the modified power generator, in accordance with the practice of this invention, noxious gases are eliminated by the steps of first, using the required amount of excess air, usually at least 1 to 25% preferably 10 to 20% excess air, to achieve essentially complete oxidation of the sulfur bearing fossil fuel. The lower levels of excess air are employed for gaseous and normally liquid carbonaceous fuels with the higher levels being employed for normally solid fuels such as coal.

A hydrocarbon capable of forming a hydrogen containing reducing gas is then introduced above the combustion chamber following complete oxidation of the fuel in an amount from that required to scavenge the excess oxygen present to produce a resultant gas stream which is still slightly oxidizing in nature up to that necessary to ultimately convert the oxides of sulfur to hydrogen sulfide, but insufficient to cause formation of excess amounts of carbon monoxide or free carbon.

After mixing of the reducing gas with the boiler flue gases, the gas stream is cooled in the boiler to obtain useful steam or other heating values then passed through a catalytic converter where any remaining oxides of sulfur and oxides of nitrogen are effectively converted to hydrogen sulfide and inert nitrogen or ammonia. The hydrogen sulfide formed is extracted from the gas stream by conventional means such as the Stretford process before venting the residual flue gas stream to the atmosphere.

If the amount of reducing gas introduced to the boiler is only that amount required to scavenge excess oxygen, such that the gas stream leaving the boiler remains slightly oxidizing, there is provided auxiliary means to add a make-up hydrogen containing reducing gas to convert the flue gas to a reducing state prior to passage through the catalyst stage where the oxides of sulfur are converted to hydrogen sulfide and the oxides of nitrogen to inert nitrogen and ammonia.

Where the auxiliary or make up reducing gas is introduced beyond the boiler stage, it may be introduced from an external reducing gas generator or by diverting a portion of the flue gas stream and combining it with air and a hydrocarbon, such as methane, in an auxiliary boiler to generate the reducing gas required for elimination of the oxides of sulfur and the oxides of nitrogen.

The latter two alternatives are particularly preferred, as they permit the use of ordinary materials of construction in boiler fabrication without fear of creating corrosive conditions which can occur if all the required reducing gases are formed in the high temperature section of the boiler.

THE DRAWINGS

DESCRIPTION

Figure 1:
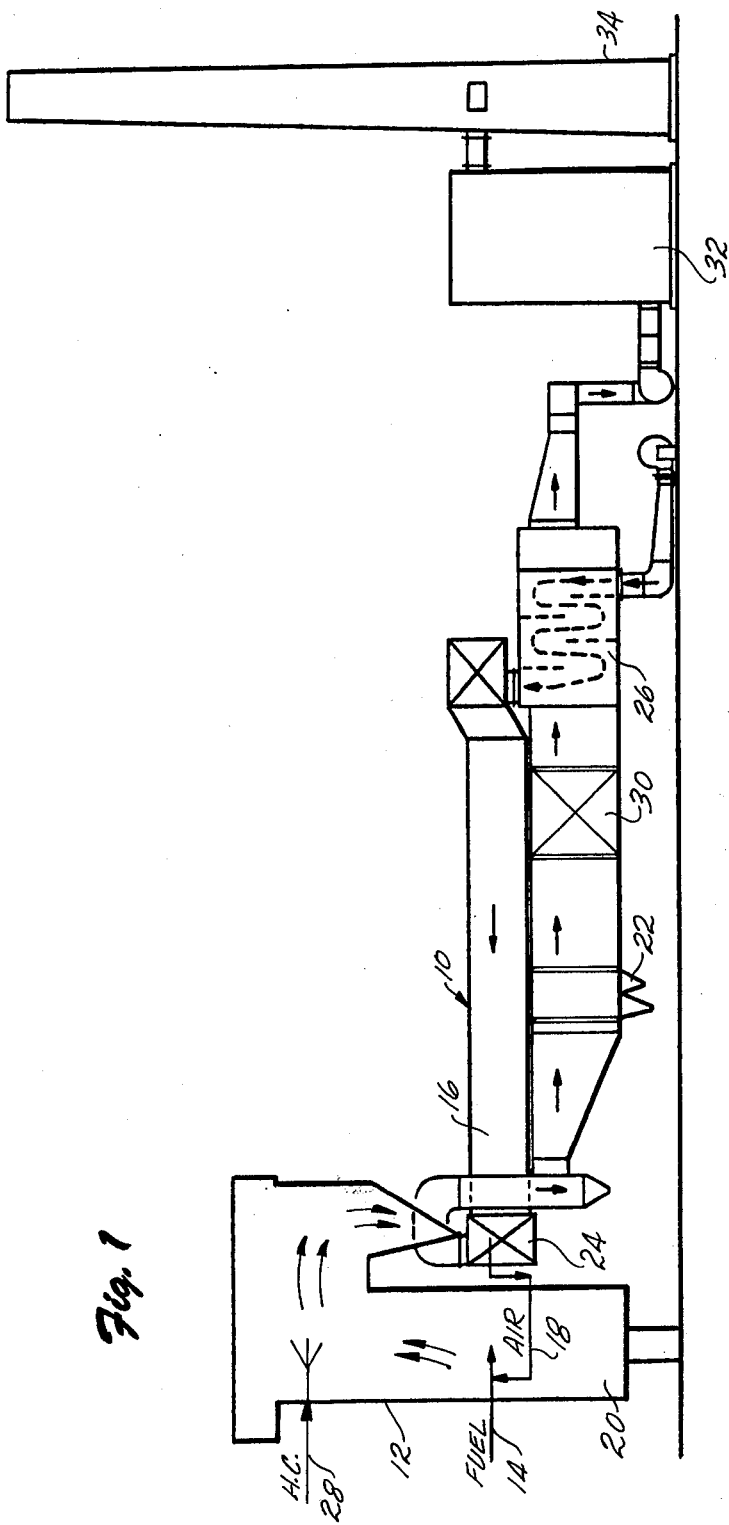
FIG. 1 is an illustration of one scheme for modifying a power generator in accordance with the practice of the invention and the method of eliminating air pollutants as a result of its modification.

With reference first to FIG. 1, in a power generator 10, the boiler 12 is supplied with a primary fuel normally a sulfur bearing carbonaceous fuel such as pulverized sulfur bearing coal or sulfur bearing hydrocarbon liquid in line 14 which enters along with preheated air from duct 16 in line 18 to combustion section 20. Carbon values are completely consumed due to the addition of excess air, usually at least 1 to 25% and preferably 10 to 20% in excess of that required to convert the carbonaceous fuel to carbon dioxide and heat. The amount of excess air introduced depends on the nature of the carbonaceous fuel. As little as 1% excess air can be employed for gaseous to liquid fuels with at least 10% excess air being employed for normally solid fuels.

In addition to combustion zone 20, boiler 12 normally contains a radiant boiler section, a convection boiler section, and a high temperature economizer and may be followed by electrostatic precipitator 22 to remove fly ash. Other means to remove ash can also be employed. For instance cyclone, bag filters and the like may also be employed as effluent from these systems is normally sufficiently fine to pass through the catalyst section employed and can be removed in the liquid $H_2S$ absorption systems used in this invention. The air required from combustion is blown into air preheater 26, and passes by duct 16 through high temperature economizer 24, where it enters the combustion zone, through line 16 normally at temperatures from 500° to 600° F.

The combustion products in transferring their heat by convection and radiation to boiler feed water are cooled from their adiabatic combustion temperature to about 2000° F to about 3000° F in the upper portion of the combustion zone of boiler 12.

At this point, there is added a vaporized hydrocarbon (H.C.) such as methane, through a multiplicity of high velocity jets fed through by line 28 to insure rapid and uniform mixing with a boiler combustion gas.

For a fuel such as natural gas, a portion of the fuel may be diverted to the high temperature zone, where reducing gases are generated as explained below. Where sulfur is absent, the oxides of nitrogen are converted to nitrogen and/or ammonia.

In the high temperature zone, the methane reacts with the excess oxygen to form carbon monoxide and hydrogen according to the reaction:

$$CH_4 + \tfrac{1}{2} O_2 \rightarrow CO + H_2 \tag{1}$$

In addition, the methane reacts with water vapor present to form more hydrogen and carbon monoxide by the reaction:

$$CH_4 + H_2O \rightarrow CO + H_2 \tag{2}$$

Figure 4:
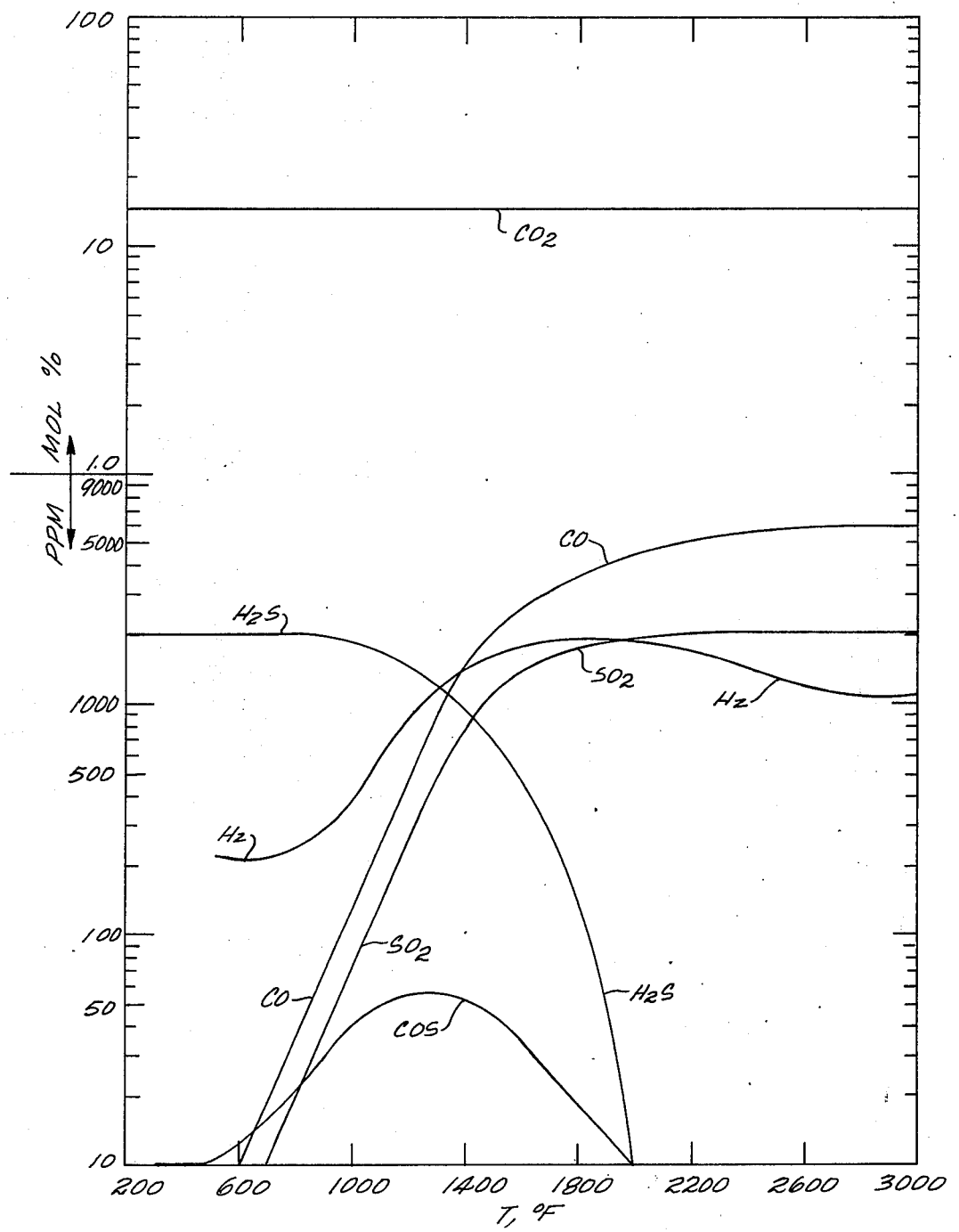
FIG. 4 is an equilibrium concentration of some flue gas constituents in the boiler as a function of temperature.

Carbon monoxide reacts with water vapor to form carbon dioxide and hydrogen by a water gas shift reaction:

$$CO + H_2O \rightarrow CO_2 + H_2O \tag{3}$$

the reaction, with reference to FIG. 4, being favored as temperatures decrease as the flue gas passes through boiler 12. As indicated, other hydrocarbons which will be atomized in boiler 12 may also be employed.

The combustion of the auxiliary fuel with the excess oxygen is very rapid. As a reducing gas is formed a temperature increase occurs due to the exothermic heat of reaction which is recovered as useful heat. The amount of reducing gas used is carefully controlled in order to consume virtually all of the excess oxygen introduced originally into the furnace with the excess air and convert some of the $SO_2$ and $SO_3$ to $H_2S$ and the nitrogen oxides to nitrogen.

Preferably, the reaction mixture should have sufficient hydrogen molecules, hydrogen atoms, hydroxyl ions, carbon monoxide and water vapor for intimate mixing with furnace combustion products to promote a high rate of reaction with effective scavenging of the excess oxygen in the furnace combustion products.

The operation also increases furnace efficiency by eliminating the excess air, $SO_2$ and $SO_3$, thereby allowing reduction of the flue gas to a lower temperature with heat recovery before it leaves the boiler without danger of causing corrosion.

With reference again to FIG. 4, during cooling of the gases as they go through the boiler, equilibrium favors the reduction of $SO_2$, $SO_3$, $CS_2$, $CO$, $COS$, $NO$ and $HCN$ in the chemically reducing atmosphere. However, rates of reaction also decrease. Thus, the flue gas leaving the boiler section still contains residual oxides of sulfur and nitrogen.

To effectively eliminate them, the gas stream now at a temperature from about 300° F to about 800° F is passed through added catalyst zone 30. Catalyst zone 30 contains one or more metals or their sulfides typically supported on an alumina, silica or alumina-silica which are capable, under reducing conditions, of converting the oxides of sulfur to hydrogen sulfide and the oxides of nitrogen to inert nitrogen and/or ammonia by respective reactions with hydrogen and water. Typical of the metals which may be employed are the Group VIII metals such as cobalt, nickel, rhodium, palladium, iridium and platinum, as well as the lower sulfides and oxides of molybdenum and chromium, promoted aluminum oxides and the like.

After conversion of the oxides of sulfur to hydrogen sulfide and the oxides of nitrogen to inert nitrogen and/or ammonia, the flue gas stream is passed through a low temperature air preheater 26 and to a hydrogen sulfide extraction unit 32.

Because $SO_3$, $SO_2$ and $NO_x$ are virtually eliminated from the flue gas, gas temperature can be reduced to about 120° to about 150° F in the air preheater 26 without causing corrosive dilute acids such as sulfuric, polythionic, sulfurous and nitric acids to condense in the duct work or contaminate the chemicals used in hydrogen sulfide extraction unit 32.

Any number of methods are feasible for hydrogen sulfide removal with absorption methods being preferred. For instance, the cooled tail gas may be passed through alkaline absorption solutions which are continuously regenerated by oxidation to produce elemental sulfur using catalysts such as sodium vanadate, sodium anthraquinone disulfonate, sodium arsenate, sodium ferrocyanide, iron oxide, iodine and like catalysts.

A convenient alternative is to use absorption solutions containing amines, sulfonates, potassium carbonates and like absorbents for hydrogen sulfide which can be continuously regenerated by steam stripping to produce hydrogen sulfide.

The preferred hydrogen sulfide extraction system is one which involves the alkaline absorption of hydrogen sulfide and oxidation to produce sulfur. The preferred system is known as the "Stretford Process", which employs a solution containing sodium carbonate, sodium vanadate and sodium anthraquinone disulfonic acid as the absorbent used in the absorber. The absorbed hydrogen sulfide is oxidized by sodium vanadate to form sulfur in the absorber and retention tank (not shown), and the absorbing solution is then regenerated by oxidation with air in an oxidizer (not shown). The sulfur is recovered from the solution by conventional means such as flotation, filtration, centrifuging, melting, decantation under pressure and the like.

The Stretford Process for stripping hydrogen sulfide from the tail gas is particularly preferred because the flue gas contains carbon dioxide as this component is not extracted. Accordingly, chemical and/or utility requirements are substantially reduced.

After hydrogen sulfide is extracted, the residual flue gas is vented to the atmosphere by stack 34.

In some instances, providing all of the auxiliary fuel gas required to create reducing conditions in the boiler 12 leads to sulfide formation. At the high temperatures present in the boiler this may necessitate the use of alloy or specially treated steels in boiler construction to prevent corrosion.

Figure 2:
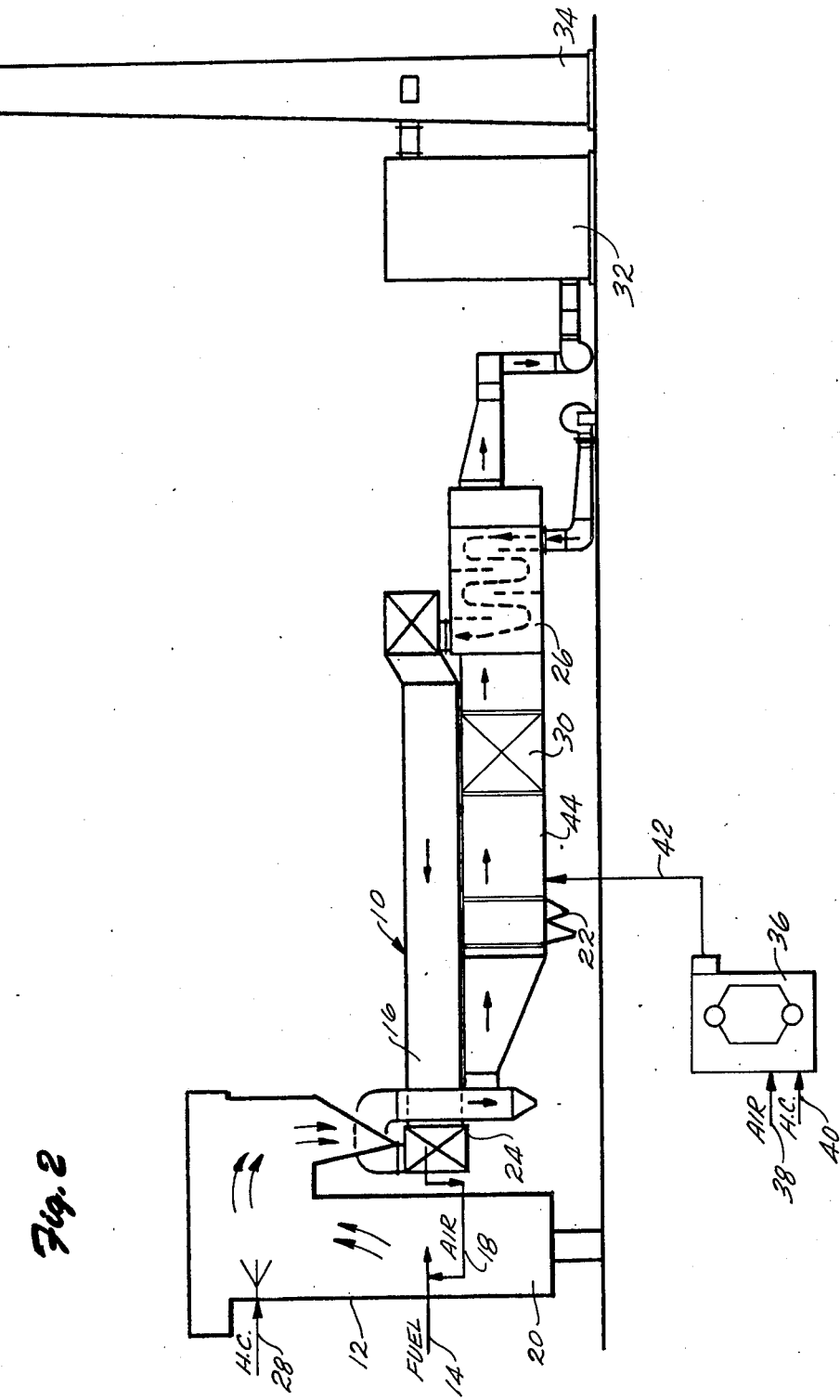
FIG. 2 is yet another illustration of another scheme for modifying a power generator in accordance with the practice of the invention in which the reducing gas is formed in an auxiliary generator for introduction downstream of the boiler section prior to passing the combined gas stream through the catalytic conversion zone.
Figure 3:
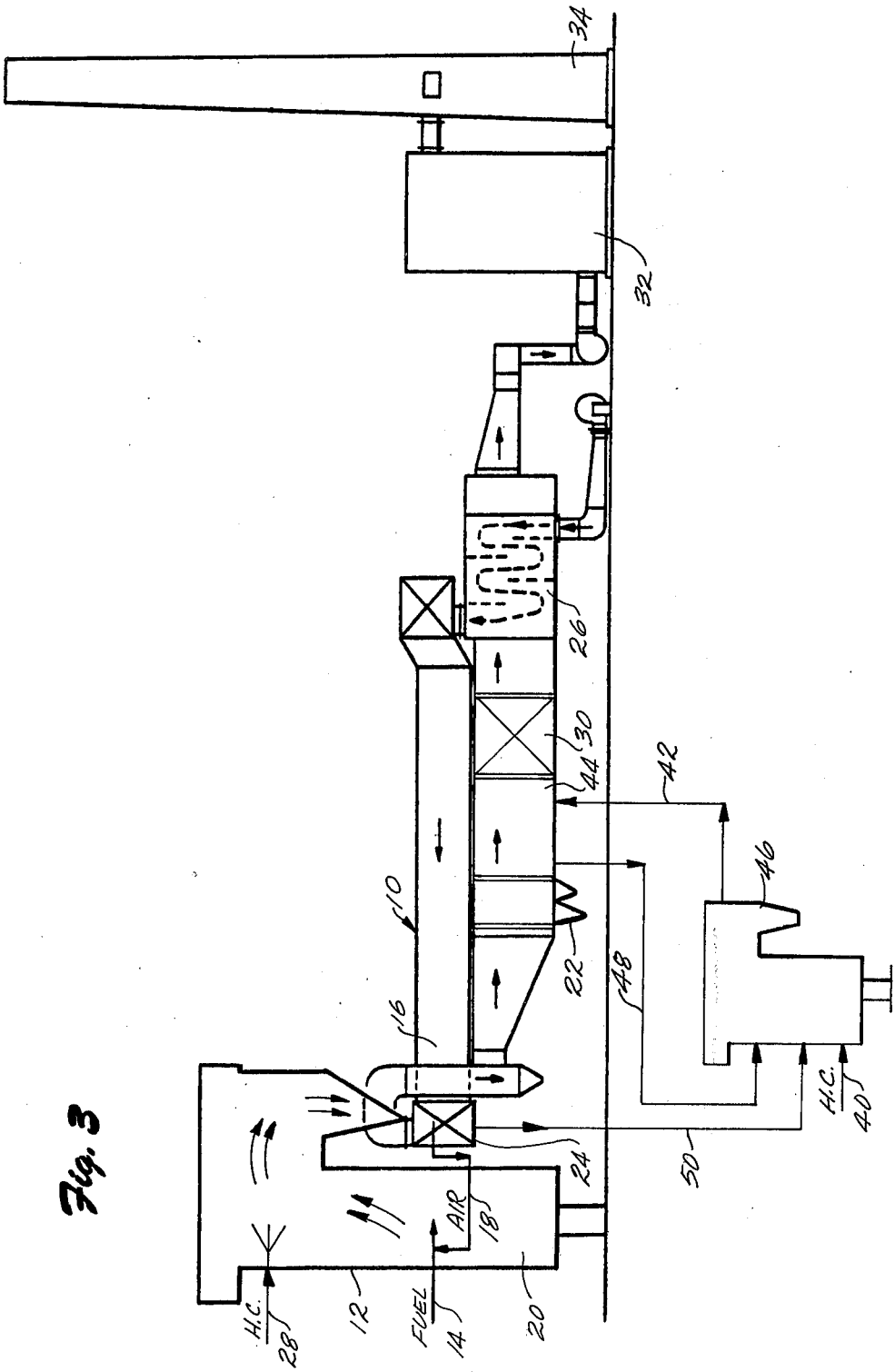
FIG. 3 is another alternate embodiment of the schematic operation illustrated in FIG. 2.

For existing power generators, therefore, the schemes shown in FIGS. 2 and 3 are preferred.

With reference to FIGS. 2 and 3, the amount of fuel gas introduced to the boiler is only that required to scavenge substantially all of the excess oxygen present, such that the flue gas exiting the boiler is slightly oxidizing to neutral in nature. This permits ordinary materials of construction to be used in the boiler.

With particular reference to FIG. 2, there is provided an auxiliary reducing gas generator 36, to which air and a hydrocarbon, such as methane, are respectively fed by lines 38 and 40.

In auxiliary boiler 36, the air to hydrocarbon ratio are suitably adjusted to provide a reducing gas which is high in hydrogen and carbon monoxide concentration and relatively low in carbon dioxide concentration.

The reducing gas may be effectively formed by reactions 1 to 3 above, and passed by line 42 to duct 44 between electrostatic precipitator 22 and catalytic conversion zone 30.

Intimate mixing of the reducing gas with the flue gas from boiler 12 is achieved in order that complete conversion of the oxides of sulfur to hydrogen sulfide and complete conversion of the oxides of nitrogen to inert nitrogen and/or ammonia will occur in catalytic chamber 30. From there, the effluent flue gas stream is cooled and passed through hydrogen sulfide extraction zone 32 where the hydrogen sulfide is extracted before the gas is vented to the atmosphere with or without reheating.

With reference to FIG. 3, there is provided a modification of the scheme shown in FIG. 2.

This employs an auxiliary boiler 46, which is fed a portion of the flue gas in line 48, at the flue gas temperature, namely from about 300° to about 800° F, and a portion of the preheated air in line 50 to auxiliary boiler 46.

Since the flue gas does not contain sufficient reagents to form the required reducing gas for recombination with the flue gas, there is added an additional hydrocarbon, such as methane, in line 40 to boiler 46. In boiler 46, reactions 1 to 3 above may occur to provide a reducing gas.

A portion of the heat generated is extracted as useful energy and the resultant cooled reducing gas at a temperature from about 300° to about 800° F, passed by line 42 to duct 44 for intimate mixing with the flue gas prior to contact with the catalyst in catalyst chamber 30.

Again, following conversion of the oxides of sulfur to hydrogen sulfide and the oxides of nitrogen to inert nitrogen and/or ammonia, the hydrogen sulfide is extracted from the gas stream in extraction zone 32 prior to venting the residual flue gas to the atmosphere through stack 34.

In a typical operation, the preheated air will enter boiler 46 through line 50 at a temperature of about 550° F while the flue gas enters as a bypass through line 48 at a temperature of about 800° F, and a resultant reducing gas exits the auxiliary boiler at a temperature of about 600° F for intimate mixing with the remainder of the flue gas passing to catalyst zone 30.

As it will be appreciated to one skilled in the art to which the invention relates, the amount of hydrocarbon fuel to be fed to the principal boiler 12 where it alone is to be used or the balance of hydrocarbon fed to auxiliary reducing gas generator 36, or auxiliary boiler 46 can be readily determined by the operating conditions desired and through an analysis of the gas streams in the various stages of the operation.

In accordance with the practice of this invention, the flue gas which is vented to the atmosphere will contain about 10 ppm $H_2S$ or less and be virtually free of sulfur, the oxides of sulfur, the oxides of nitrogen and particulates.

While no wise limiting, the following are examples of the invention.

EXAMPLE 1

In the conventional 500 MW boiler plant 284,921 lbs/hr of coal of the following ultimate analysis shown in Table I:

Table I

| Constituent | Weight % |
|---|---|
| Carbon | 70.0 |
| Hydrogen | 5.3 |
| Sulfur | 3.6 |
| Oxygen | 10.7 |
| Nitrogen | 1.4 |
| Ash | 9.0 |

Table I-continued

| Constituent | Weight % |
|---|---|
| Total | 100.0 | is burned with 15% excess air to insure complete coal combustion. This produces flue gas at the rate of 144,481 mols/hr and having the approximate composition shown in Table II:

Table II

| Constituent | Volume % |
|---|---|
| $CO_2$ | 14.45 |
| $H_2O$ | 8.58 |
| $O_2$ | 2.70 |
| $N_2$ | 74.00 |
| $SO_2$ | 0.27 |
| Total | 100.00 |

The flue gas also contains 700 to 1,500 parts per million by volume of nitrogen oxides. The high concentration of $SO_2$ (plus $SO_3$) and nitrogen oxides are in excess of the limits normally allowed by the state and local regulations.

To convert the difficult to remove $SO_x$ to move readily removable $H_2S$ and the $NO_x$ to harmless nitrogen and ammonia, the combustion products after transferring their heat by convection and radiation to the boiler feed water are cooled from their adiabatic combustion temperature to about 2,500° F in the upper portion of the combustion zone.

To this zone there is added 1,939 mols/hr of methane. The methane is added through a multiplicity of high velocity jets to insure rapid and uniform mixing with the boiler combustion gases. In the high temperature zone of the boiler, the methane reacts with the excess oxygen to form CO and hydrogen according to the following reaction:

$$CH_4 + \tfrac{1}{2} O_2 \rightarrow CO + 2H_2 \quad (1)$$

In addition, some of the methane reacts with the high temperature water vapor as follows:

$$CH_4 + H_2O \rightarrow CO + 3H_2 \quad (2)$$

The CO reacts further at reduced flue gas temperatures with water vapor as follows:

$$CO + H_2O \rightarrow CO_2 + H_2 \quad (3)$$

as the gas stream cools.

The hydrogen formed in the presence of supported cobalt-molybdate catalyst in a catalyst zone inserted in the duct following the electrostatic precipitator reacts with the $SO_2$ and $SO_3$ to form $H_2S$ and water and with the oxides of nitrogen to form nitrogen, water and some ammonia to form a flue gas having the approximate composition shown in Table III:

Table III

| Constituent | % by Volume |
|---|---|
| CO | 0.05 |
| $CO_2$ | 15.68 |
| $H_2$ | 0.63 |
| $H_2O$ | 10.65 |
| $H_2S$ | 0.27 |
| $N_2$ | 72.72 |

Table III-continued

| Constituent | % by Volume |
|---|---|
| Total | 100.00 |

Flue gas temperature is about 30° F.

Because the oxides of sulfur and nitrogen are eliminated from the flue gas, the flue gas temperature is now reduced to 130° F in a low temperature air preheater without condensation of dilute corrosive sulfurous, sulfuric or nitric acids. This is also an increase in boiler efficiency by about 5% which for the 500 MW boiler and a fuel valued at $0.30MMBtu amounts to about $500,000yr in fuel saving.

The volume of flue gas leaving the boiler is 117,829 mols/hr at 130° F and the hydrogen sulfide can be readily removed by contact in a Stretford unit in which the $H_2S$ is absorbed by the alkaline solution and the absorbed $H_2S$ oxidized to sulfur which is recovered.

EXAMPLE 2

The procedure of Example 1 is repeated except that only a portion of the total reducing gas is added to the boiler furnace in order to scavenge the excess oxygen present in the combustion gases and to eliminate substantially all of the $SO_3$ and most of the $NO_x$, but without an appreciable reduction in the amount of $SO_2$. The flue gas still remains slightly oxidizing requiring no change in the usual materials of construction for the boiler. The oxides of nitrogen are reduced to an acceptable concentration and highly corrosive $SO_3$ eliminated from the flue gas.

In achieving this situation, to the combustion gases at 2,500° F in the combustion zone of the furnace there is only added 1,463 mols/hr of a methane at 60° F. At the high furnace temperatures, the reaction of methane and oxygen takes place increasing the temperature to about 2,850° F.

Table IV shows the flue gas composition with and without the methane injection. No catalytic chamber is employed.

Table IV

| | Flue Gas-Volume % | |
|---|---|---|
| Constituent | No Methane Injection | With Methane Injection |
| $CO_2$ | 14.45 | 15.51 |
| $H_2O$ | 8.58 | 10.87 |
| $O_2$ | 2.70 | 100 ppm |
| $N_2$ | 74.00 | 73.35 |
| $SO_2$ | 0.26 | 0.27 |
| $SO_3$ | 0.01 | 5 ppm |
| | 100.00 | 100.00 |
| $NO_x$ | 850 ppm | 350 ppm |

The balance of the methane required to achieve a reducing condition, namely the difference between the amount of methane fed to the combustion zone as in Example 1, and the amount fed to the combustion zone in the present Example is combined with air in an auxiliary reducing gas generator, the proportions of air to methane being such that a reducing gas containing about 10 to 15% free hydrogen is formed.

The reducing gas is combined with the effluent flue gas from the boiler after the flue gases have passed through an electrostatic precipitator for fly ash removal.

The flue gas after admixture with the reducing gas is then passed through a catalytic conversion zone where the oxides of sulfur are reduced to a concentration of less than 10 parts per million and sulfur trioxide and the oxides of nitrogen essentially eliminated.

Following passage through a Stretford unit for hydrogen sulfide removal the gas stream is vented to the atmosphere.

EXAMPLE 3

In the power plant 312,500 lbs/hr of coal are burned with 3,465,500 lbs/hr of air preheated to 550° F. In the upper portion of the combustion chamber, after the gases have given up some of their heat of combustion to the furnace tubes and cooled to about 2,500° F there is added 25,750 lbs/hr of methane. The methane reacts with the oxygen and $NO_x$ at the high resulting temperature of 2,800° F to form CO, $CO_2$, $H_2O$, $H_2$ and reduce substantially the $NO_x$ and $SO_3$ present. The gas is cooled to 700° F while transferring heat to the boiler superheater, steam generating and economizer sections. The flue gas stream then goes through a high efficiency electrostatic precipitator to remove substantially all of the fly ash.

To the cooled clean flue gases there is added from an auxiliary boiler 123,850 lbs/hr of a reducing gas mixture having the composition shown in Table V.

Table V

| Constituent | Volume % |
| --- | --- |
| CO | 7.6 |
| $CO_2$ | 5.4 |
| $H_2$ | 13.2 |
| $N_2$ | 59.0 |
| $H_2O$ | 14.8 |
| | 100.00 |

The combined gas stream is passed over a hydrogenation catalyst where the sulfur compounds present in the gas are reduced to $H_2S$ and the remaining $NO_x$ is reduced to nitrogen and ammonia.

The reducing gas stream is formed by burning 10,850 lbs/hr of methane with 113,000 lbs/hr of air in an auxiliary boiler. The resultant stream leaves the low temperature air preheating economizer at 130° F has the composition shown in Table VI:

Table VI

| Constituent | Volume % |
| --- | --- |
| $CO_2$ | 15.45 |
| $H_2$ | 0.25 |
| $N_2$ | 72.76 |
| $H_2S$ | .26 |
| $H_2O$ | 11.28 |
| | 100.00 |

The gas is sent to an absorber where the $H_2S$ is removed to a level of less than 10 ppm and the flue gas is reheated and discharged to the atmosphere essentially free of sulfur, $NO_x$ and particulates.

What is claimed is:

1. A process for elimination of at least the oxides of sulfur and the oxides of nitrogen from flue gases formed in the combustion zone of the boiler of power generating apparatus which consumes sulfur bearing fossil fuels which comprises:
   a. combusting the sulfur bearing fossil fuel in the combustion zone in presence of excess air to form a high temperature flue gas containing oxides of carbon, oxides of sulfur, oxides of nitrogen, water and uncombined oxygen;
   b. combining an atomized hydrocarbon fuel with the high temperature flue gas to generate a hydrogen containing reducing gas in an amount at least sufficient to consume substantially all of the uncombined oxygen contained in the high temperature flue gas;
   c. cooling the high temperature flue gas in said boiler to extract heat values therefrom;
   d. catalytically converting at least the contained oxides of sulfur to hydrogen sulfide and the oxides of nitrogen to a nitrogen compound selected from the group consisting of nitrogen, ammonia and mixtures thereof by passing the cooled flue gas and a hydrogen containing reducing gas at temperatures of from about 300° F, to about 800° F through a catalytic conversion zone containing a catalyst capable of converting the oxides of sulfur to hydrogen sulfide and the oxides of nitrogen to nitrogen and ammonia;
   e. extracting the formed hydrogen sulfide from the flue gas stream and venting the flue gas stream to the atmosphere.

2. A process as claimed in claim 1 in which the hydrocarbon fuel is combined with the high temperature flue gas is at a flue gas temperature of from about 2,000° F to about 3,000° F.

3. A process as claimed in claim 1 in which hydrocarbon fuel is added to the flue gas in an amount sufficient to provide all of the hydrogen required to consume the excess oxygen and hydrogenate the oxides of sulfur to hydrogen sulfide and wherein a portion of the contained oxides of sulfur are hydrogenated to hydrogen sulfide and the oxides of nitrogen are converted to the nitrogen compound in said boiler.

4. A process as claimed in claim 2 in which hydrocarbon fuel is added to the flue gas in an amount sufficient to provide all of the hydrogen required to consume the excess oxygen and hydrogenate the oxides of sulfur to hydrogen sulfide and wherein a portion of the contained oxides of sulfur are hydrogenated to hydrogen sulfide and the oxides of nitrogen are converted to the nitrogen compound in said boiler.

5. A process as claimed in claim 1 in which the hydrogen containing reducing gas passing with the cooled flue gas to said catalytic conversion zone is generated external to said power generating apparatus and added to said cooled flue gas at a temperature of from about 300° F to about 800° F.

6. A process as claimed in claim 2 in which the hydrogen containing reducing gas passing with the cooled flue gas to said catalytic conversion zone is generated external to said power generating apparatus and added to said cooled flue gas at a temperature of from about 300° F to about 800° F.

7. A process as claimed in claim 1 in which the catalyst contains a metal selected from the group consisting of cobalt, nickel, rhodium, palladium, iridium, platinum, molybdenum, chromium and mixtures thereof contained on a support selected from the group consisting of alumina, silica, alumina-silica and mixtures thereof.

8. A process as claimed in claim 2 in which the catalyst contains a metal selected from the group consisting of cobalt, nickel, rhodium, palladium, iridium, platinum, molybdenum, chromium and mixtures thereof contained on a support selected from the group consisting of alumina, silica, alumina-silica and mixtures thereof.

9. A process as claimed in claim 1 in which the formed hydrogen sulfide is extracted from the flue gas by contacting the flue gas with a hydrogen sulfide absorption solution.

10. A process as claimed in claim 9 in which the absorbed hydrogen sulfide is oxidized to elemental sulfur using a catalyst selected from the group consisting of sodium vanadate, sodium anthraquinone disulfonate, sodium arsenate, sodium ferrocyanide, iron oxide and iodine.

11. A process as claimed in claim 9 in which the flue gas stream is cooled to a temperature of from about 120° F to about 150° F prior to contact with the absorption solution.

12. A process as claimed in claim 1 in which the air supplied to the combustion zone is from about 1 to 25% in excess of that required for the combustion of said sulfur bearing fossil fuel.

13. A process as claimed in claim 2 in which the air supplied to the combustion zone is from about 1 to 25% in excess of that required for the combustion of said sulfur bearing fossil fuel.

14. A process for elimination of the oxides of nitrogen from flue gases formed in the primary flame zone of the combustion zone of the boiler of power generating apparatus which comprises:

a. combusting a primary fuel in the combustion zone in presence of excess air to form a high temperature flue gas containing oxides of carbon, oxides of nitrogen, water and uncombined oxygen;

b. combining a vaporized hydrocarbon fuel with the high temperature flue gas above the primary flame zone to generate a hydrogen containing reducing gas in an amount at least sufficient to consume substantially all of the uncombined oxygen contained in the high temperature flue gas, and convert the oxides of nitrogen to a nitrogen compound selected from the group consisting of nitrogen, ammonia and mixtures thereof;

c. cooling the high temperature flue gas in said boiler to extract heat values therefrom, and simultaneously convert the oxides of nitrogen to the nitrogen compound;

d. catalytically converting additional contained oxides of nitrogen to the nitrogen compound passing the cooled flue gas and the hydrogen containing reducing gas at temperatures of from about 300° F, to about 800° F through a catalytic conversion zone containing a catalyst capable of converting the oxides of nitrogen to the nitrogen compound ammonia.

15. A process as claimed in claim 14 in which the vaporized hydrocarbon fuel is a portion of the primary fuel.

* * * * *